US010194417B2

(12) United States Patent
Jeong et al.

(10) Patent No.: US 10,194,417 B2
(45) Date of Patent: Jan. 29, 2019

(54) METHOD FOR PROCESSING NOTIFICATION MESSAGE IN WIRELESS COMMUNICATION SYSTEM AND APPARATUS THEREFOR

(71) Applicant: LG ELECTRONICS INC., Seoul (KR)

(72) Inventors: Seungmyeong Jeong, Seoul (KR); Seongyun Kim, Seoul (KR); Hongbeom Ahn, Seoul (KR); Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/518,645

(22) PCT Filed: Oct. 23, 2015

(86) PCT No.: PCT/KR2015/011254
§ 371 (c)(1),
(2) Date: Apr. 12, 2017

(87) PCT Pub. No.: WO2016/068548
PCT Pub. Date: May 6, 2016

(65) Prior Publication Data
US 2017/0238279 A1 Aug. 17, 2017

Related U.S. Application Data

(60) Provisional application No. 62/069,802, filed on Oct. 28, 2014.

(51) Int. Cl.
*H04W 68/02* (2009.01)
*H04W 68/00* (2009.01)
(Continued)

(52) U.S. Cl.
CPC ............ *H04W 68/02* (2013.01); *H04W 4/08* (2013.01); *H04W 4/70* (2018.02); *H04W 68/00* (2013.01)

(58) Field of Classification Search
CPC .................................................... H04W 68/02
See application file for complete search history.

(56) References Cited

U.S. PATENT DOCUMENTS

2011/0213871 A1\* 9/2011 DiGirolamo ............ H04W 4/00
709/223
2012/0220326 A1 8/2012 Li et al.
(Continued)

FOREIGN PATENT DOCUMENTS

WO  WO 2013/170410 A1  11/2013
WO  WO 2014/129802 A1  8/2014

*Primary Examiner* — Mazda Sabouri
(74) *Attorney, Agent, or Firm* — Birch, Stewart, Kolasch & Birch, LLP

(57) ABSTRACT

According to one embodiment of the present invention, a method for processing a notification message for applying a group policy to a notification subscription service in a wireless communication system is performed by a first M2M device, and comprises the steps of: receiving a plurality of notification messages; determining whether a group subscription ID matching with a group subscription ID pre-stored in the first M2M device is included in the plurality of received notification messages; indicating, by the group subscription ID, a group policy applied to the subscription service for the notification messages for member resources belonging to a specific group; and aggregating the notification messages in which the group subscription ID matching with the pre-stored group subscription ID is included, and applying, to the aggregated notification messages, the group policy corresponding to the group subscription ID.

8 Claims, 12 Drawing Sheets

(51) Int. Cl.
*H04W 4/70* (2018.01)
*H04W 4/08* (2009.01)

(56) References Cited

U.S. PATENT DOCUMENTS

| | | |
|---|---|---|
| 2013/0212236 A1 | 8/2013 | Foti et al. |
| 2013/0346504 A1* | 12/2013 | Huang .................. H04L 12/185 |
| | | 709/204 |
| 2014/0050084 A1 | 2/2014 | Cheng |
| 2014/0359035 A1* | 12/2014 | Wang ...................... H04L 51/06 |
| | | 709/206 |
| 2015/0009818 A1* | 1/2015 | Xiao ....................... H04W 4/12 |
| | | 370/230.1 |

* cited by examiner

METHOD FOR PROCESSING NOTIFICATION MESSAGE IN WIRELESS COMMUNICATION SYSTEM AND APPARATUS THEREFOR

CROSS REFERENCE TO RELATED APPLICATIONS

This application is the National Phase of PCT International Application No. PCT/KR2015/011254, filed on Oct. 23, 2015, which claims priority under 35 U.S.C. 119(e) to U.S. Provisional Application No. 62/069,802, filed on Oct. 28, 2014, all of which are hereby expressly incorporated by reference into the present application.

TECHNICAL FIELD

The present invention relates to a method of processing a notification message in a wireless communication system and an apparatus therefor.

BACKGROUND ART

In the era of ubiquitous computing, machine-to-machine (M2M) communication has attracted much attention. M2M communication technology is under study in many standard development organizations (SDOs) such as TIA, ATIS, ETSI, and oneM2M.

An M2M communication system may have a resource oriented architecture (RoA) and, thus, access to multiple resources may be efficient. Such access may be performed for the same operation (e.g., writing, reading, deleting, and execution) for the multiple resources.

If a group function is used in the RoA based M2M system, there is an advantage of simultaneously performing access to a plurality of group members. Through this group function, a group user may set a subscription capable of receiving a notification of information change of a group member. Next, the group user may aggregate notification messages of group members and transmit the aggregated messages as one notification message.

The group user may establish a notification policy for notification message transmission upon setting a subscription in a group. However, when the group user sets a plurality of subscriptions, it is difficult to factor in a policy per subscription.

DETAILED DESCRIPTION OF THE INVENTION

Technical Problems

The present invention provides a method of applying a notification policy to a group member using a group function.

The technical objects that can be achieved through the present invention are not limited to what has been particularly described hereinabove and other technical objects not described herein will be more clearly understood by persons skilled in the art from the following detailed description.

Technical Solutions

According to an aspect of the present invention, provided herein is a method of processing a notification message for applying a group policy to a notification subscription service in a wireless communication system. The method may be performed by a first machine-to-machine (M2M) device and includes receiving a plurality of notification messages; determining whether a group subscription ID matching a group subscription ID pre-stored in the M2M device is included in the received notification messages, the group subscription ID indicating a group policy applied to a subscription service for a notification message for member resources belonging to a specific group; and aggregating notification messages including the group subscription ID matching the pre-stored group subscription ID and applying a group policy corresponding to the group subscription ID to the aggregated notification messages.

Additionally or alternatively, the method may further include aggregating messages that do not include the group subscription ID matching the pre-stored group subscription ID according to target information of the notification messages.

Additionally or alternatively, the method may further include transmitting the notification messages to which the group policy is applied to a second M2M device that requests a subscription service corresponding to the group subscription ID.

Additionally or alternatively, the group subscription ID is assigned by the first M2M device.

Additionally or alternatively, the notification messages including the group subscription ID matching the pre-stored group subscription ID are received from group member M2M devices including member resources belonging to the specific group.

In another aspect of the present invention, provided herein is a machine-to-machine (M2M) device for processing a notification message for applying a group policy to a notification subscription service in a wireless communication system. The M2M device may include a radio frequency (RF) unit, and a processor configured to control the RF unit, wherein the processor may be configured to receive a plurality of notification messages, determine whether a group subscription ID matching a group subscription ID pre-stored in the M2M device is included in the received notification messages, the group subscription ID indicating a group policy applied to a subscription service for a notification message for member resources belonging to a specific group, aggregate notification messages including the group subscription ID matching the pre-stored group subscription ID, and apply a group policy corresponding to the group subscription ID to the aggregated notification messages.

Additionally or alternatively, the processor may be configured to aggregate messages that do not include the group subscription ID matching the pre-stored group subscription ID according to target information of the notification messages.

Additionally or alternatively, the processor may be configured to transmit the notification messages to which the group policy is applied to a second M2M device that requests a subscription service corresponding to the group subscription ID.

Additionally or alternatively, the group subscription ID may be assigned by the first M2M device.

Additionally or alternatively, the notification messages including the group subscription ID matching the pre-stored group subscription ID may be received from group member M2M devices including member resources belonging to the specific group.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, a notification service for a group member can be efficiently provided.

The effects that can be achieved through the present invention are not limited to what has been particularly described hereinabove and other advantages of the present invention will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
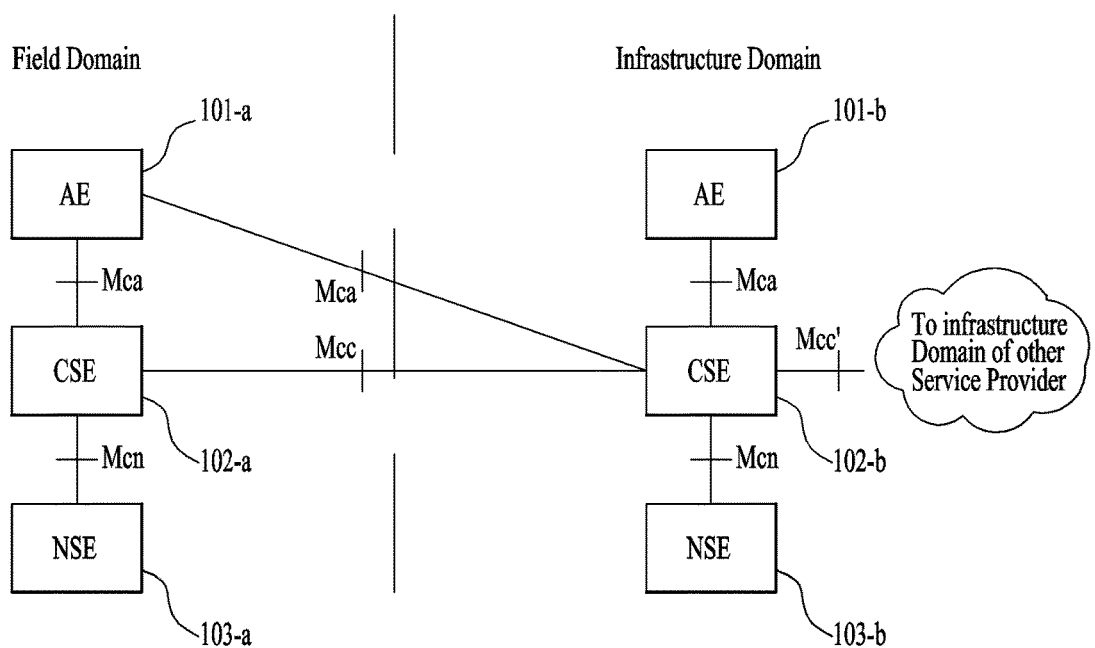
FIG. 1 illustrates a functional structure of an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
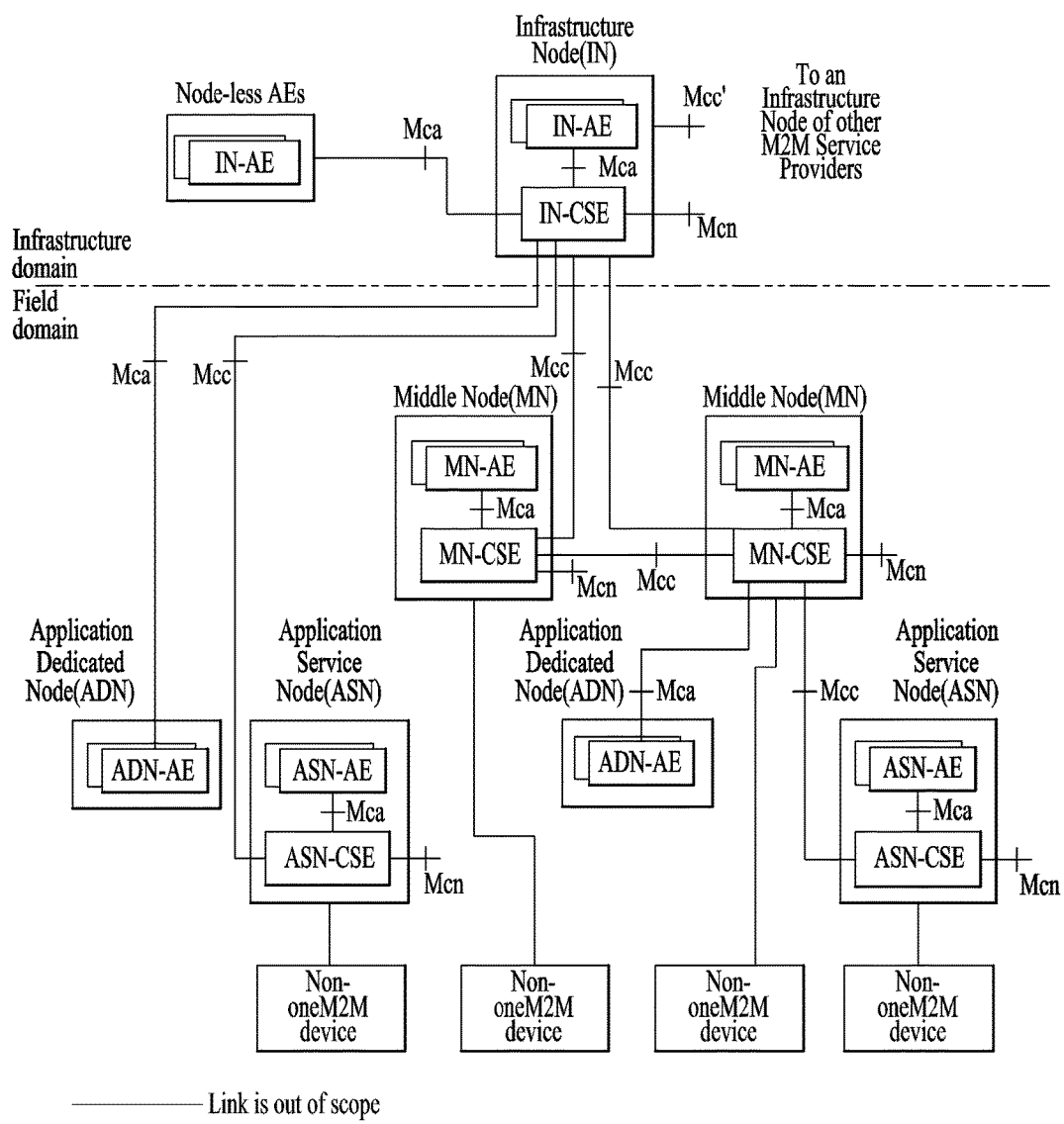
FIG. 2 illustrates a configuration supported by an M2M communication system based on an M2M functional structure.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;
one or more middle nodes (MNs); and
one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or
one or more application service nodes.

The IN may communicate with one or more ADNs over one or more Mca reference points.

Figure 3:
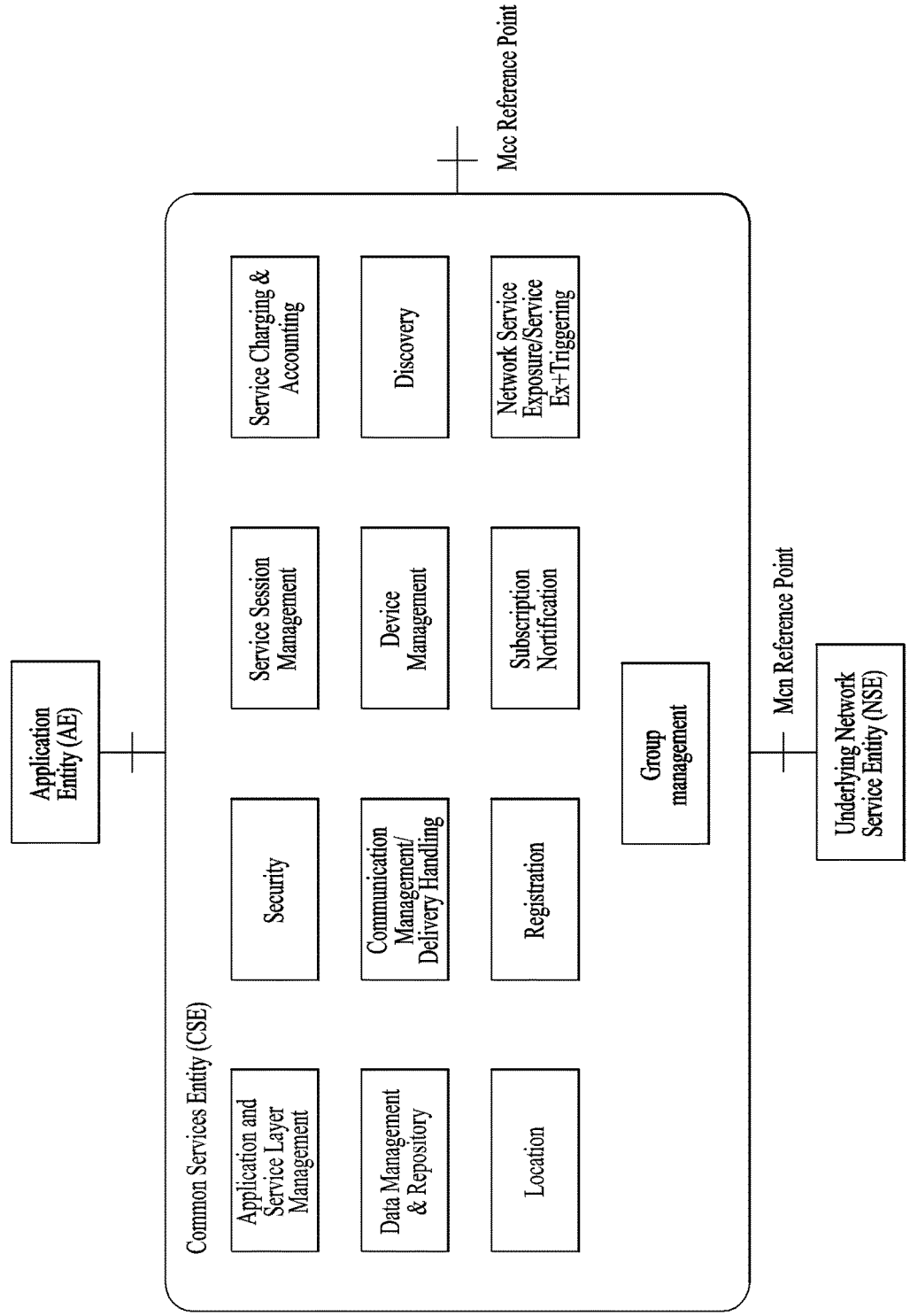
FIG. 3 illustrates common service functions provided by an M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
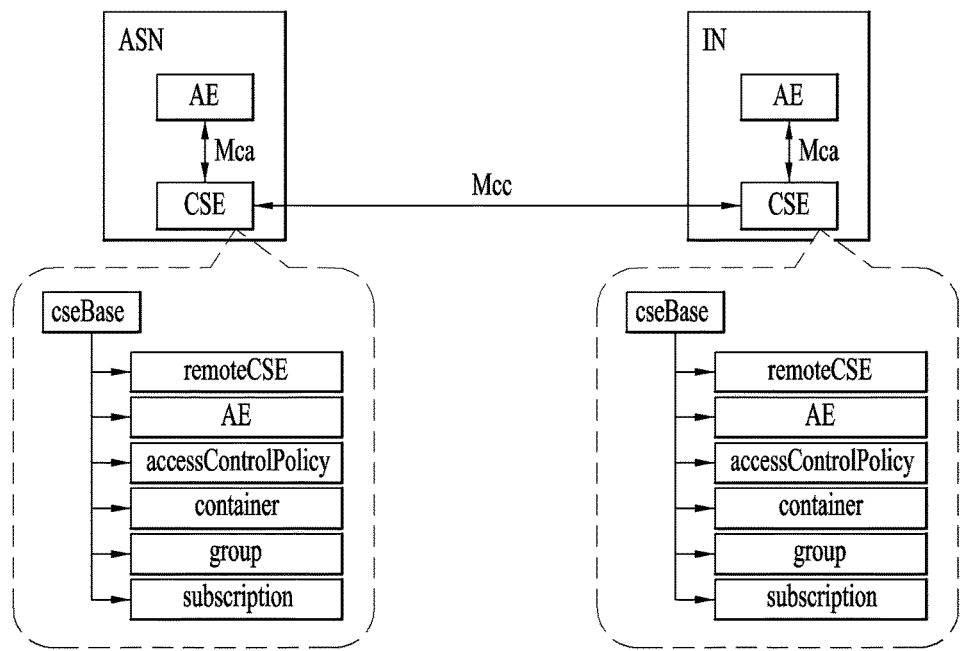
FIG. 4 illustrates resource structures in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
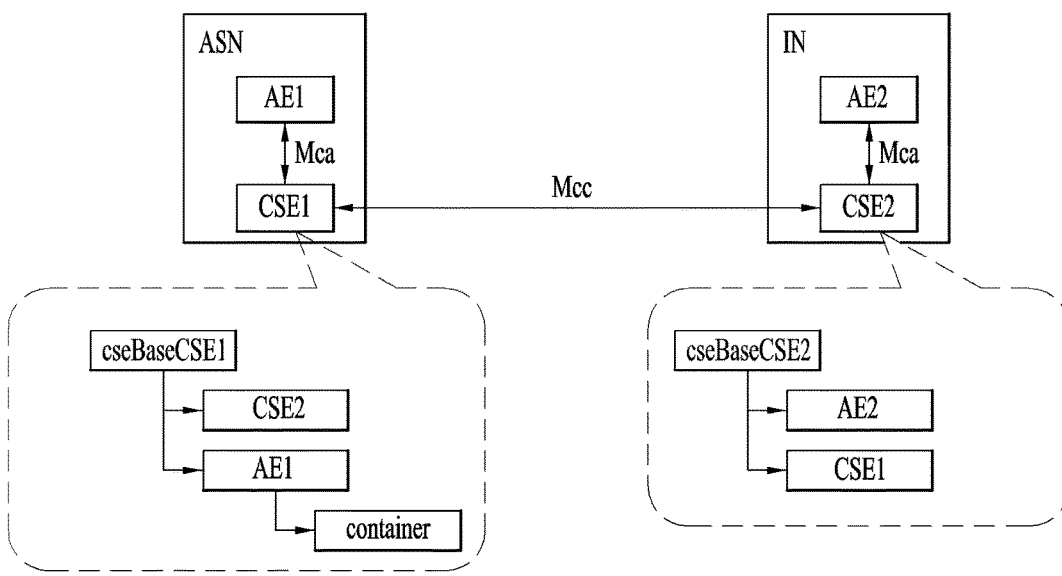
FIG. 5 illustrates resource structures in an M2M application service node (e.g., an M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As shown in FIG. 4 or 5, the resource for use in the M2M system may be represented by a tree structure, and the root resource type may be denoted by <CSEBase>. Therefore, the <CSEBase> resource type must be present only when the common service entity (CSE) is present.

Figure 6:
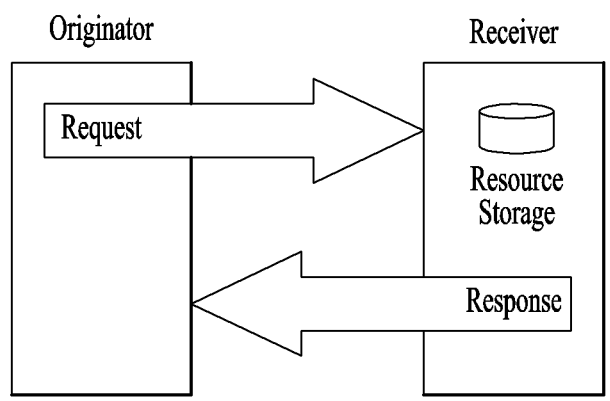
FIG. 6 illustrates a procedure for exchanging request and response messages used in a wireless communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.

- Operation: "Operation" means the shape of an operation to be carried out. (This information may be selected from among Create, Retrieve, Update, Delete, and Notify.)
- To: "To" means an ID (i.e., ID of the receiver) of an entity scheduled to receive the request.
- From: "From" means an ID of a calling user (i.e., call originator) who generates the request.
- Request Identifier: "Request Identifier" means an ID (i.e., ID used to discriminate the request message) of the request message
- Group Request Identifier parameter (identifier to prevent group fan-out request messages from being repeated)
- Content: "Content" means content of resources to be transmitted.

The response message may include the following information. If the corresponding request message is successfully processed, the response message may include the following information.

- To: "To" means an ID of a calling user (i.e., a call originator) who generates the request message.
- From: "From" means an ID of a called person (i.e., a call receiver) who receives the request message.
- Request Identifier: "Request Identifier" means an ID of the request message used to identify the ID of the request message.
- Result contents: "Result contents" means the processed result (for example, Okay, Okay and Done, Okay and in progress) of the request message.
- Content: "Content" means content of resources to be transmitted (only the resultant value (rs) can be transmitted.)

If the request message processing is failed, the response message may include the following information.

- To: "To" means an ID of a calling user (i.e., a call originator) who generates the request message.
- From: "From" means an ID of a called person (i.e., a call receiver) who receives the request message.
- Request Identifier: "Request Identifier" means an ID of the request message (so as to identify the ID of the request message).
- rs: "rs" means the processed result (for example, Not Okay) of the request message.

As described above, the response message may include the above-mentioned information.

Meanwhile, various resource types shown in the following table are present.

TABLE 1

| Resource Type | Short Description | Child Resource Types | Parent Resource Types |
|---|---|---|---|
| AE | Stores information about the AE. It is created as a result of successful registration of an AE with the registrar CSE. | subscription, container, group, accessControl Policy, mgmtObj, commCapabilities, pollingChannel | remoteCSE, CSEBase |
| cmdhNwAccessRule | Defines a rule for the usage of underlying networks. | schedule subscription | cmdhNetworkAccessRules |
| CSEBase | The structural root for all the resources that are residing on a CSE. It shall store information about the CSE itself. | remoteCSE, node, application, container, group, accessControl Policy, subscription, mgmtObj, mgmtCmd, locationPolicy, statsConfig | None |
| group | Stores information about resources of the same type that need to be addressed as a Group. Operations addressed to a Group resource shall be executed in a bulk mode for all members belonging to the Group. | fanOutPoint subscription | Application, remoteCSE, CSEBase |
| locationPolicy | Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControl Policy, subscription, mgmtObj, pollingChannel, node | CSEBase |

TABLE 1-continued

| Resource Type | Short Description | Child Resource Types | Parent Resource Types |
|---|---|---|---|
| subscription | Subscription resource represents the subscription information related to a resource. Such a resource shall be a child resource for the subscribe-to resource. | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription | application, container, remoteCSE, CSEBase |
| contentInstance | Represents a data instance in the container resource. | subscription | container |

Each resource type may be located below the parent resource type of the corresponding resource type, and may have a child resource type. In addition, each resource type may have attributes, and actual values may be stored in the attributes.

Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attributes of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resourceType attribute. |
| resourceID | 1 | RO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE. |
| parentID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE1" which has been created under the resource " . . . //example.com/oneM2M/myCSE", the value of the parentID attribute will contain " . . . //parentID". |

TABLE 2-continued

| Attributes of <container> | Multiplicity | RW/RO/WO | Description |
|---|---|---|---|
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |
| labels | 0 . . . 1 | WR | Tokens used as keys for discovering resources. This attribute is optional and if not present it means that the resource cannot be found by means of discovery procedure which uses labels as key parameter of the discovery. |
| creationTime | 1 | RO | Time/date of creation of the resource. This attribute is mandatory for all resources and the value is assigned by the system at the time when the resource is locally created. Such an attribute cannot be changed. |
| creator | 0 . . . 1 | RO | The AE-ID or CSE-ID of the entity which created the resource. |
| lastModifiedTime | 1 | RO | Last modification time/date of the resource. This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource. The stateTag attribute of the parent resource should be incremented first and copied into this state Tag attribute when a new instance is added to the parent resource. |
| announceTo | 0 . . . 1 | RW | This attribute may be included in a CREATE or UPDATE Request in which case it contains a list of URIs/CSE-IDs which the resource being created/updated shall be announced to. This attribute shall only be present on |

TABLE 2-continued

| Attributes of <container> | Multiplicity | RW/RO/WO | Description |
|---|---|---|---|
| | | | the original resource if it has been successfully announced to other CSEs. This attribute maintains the list of URIs to the successfully announced resources. Updates on this attribute will trigger new resource announcement or de-announcement. |
| announcedAttribute | 0 . . . 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed.) |
| maxNrOfInstances | 0 . . . 1 | RW | Maximum number of instances of <contentInstance> child resources. |
| maxByteSize | 0 . . . 1 | RW | Maximum number of bytes that are allocated for a <container> resource for all instances in the <container> resource. |
| maxInstanceAge | 0 . . . 1 | RW | Maximum age of the instances of <contentInstance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 . . . 1 | RO | Reference to latest <contentInstance> resource, when present. |
| locationID | 0 . . . 1 | RW | URI of the resource where the attributes/policies that define how location information are obtained and managed. This attribute is defined only when the <container> resource is used for containing location information. |
| ontologyRef | 0 . . . 1 | RW | A URI of the ontology used to represent the information that is managed and understood by the AE. The ontology refers to a specification in which terms and relationship therebetween used in a domain to be handled. |

Resource Access Control Policy

An access control policy is defined as a "white list" or privileges and each privilege defines "allowed" entities for certain access modes. Sets of privileges are handled such that the resulting privileges for a group of privileges are the sum of the individual privileges; i.e., an action is permitted if the action is permitted by some/any privilege in the set. A selfPrivilege attribute lists entities authorized for Read/Update/Delete of <accessControlPolicy> resource.

All privileges defined by the access control policy are associated with positions, time windows and IP addresses.

Privileges for accessing a resource are defined by privileges defined in <accessControlPolicy> resource by setting an accessControlPolicyID attribute on the resource.

Figure 7:
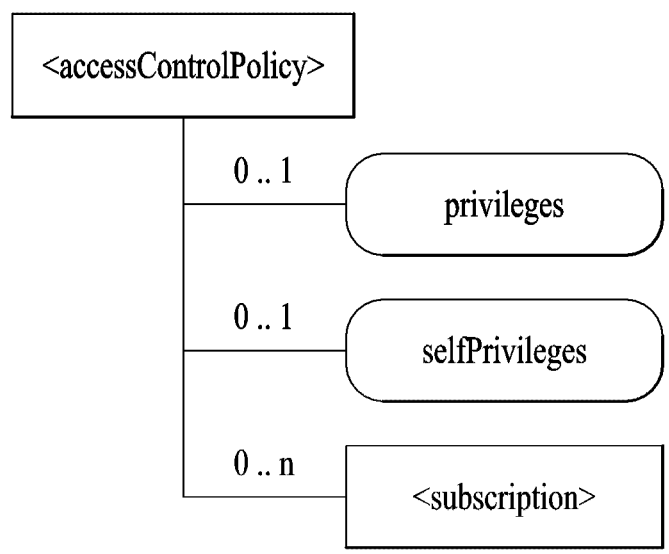
FIG. 7 illustrates the structure of an <accessControlPolicy> resource.

FIG. 7 illustrates a structure of the <accessControlPolicy> resource. The following table shows attributes of the <accessControlPolicy> resource.

TABLE 3

| Attribute Name of <accessControlPolicy> | Multiplicity | RW/ RO/ WO | Description |
|---|---|---|---|
| resourceType (rT) | 1 | RO | Refer to Table 2 |
| parentID (pID) | 1 | RO | Refer to Table 2 |
| expirationTime (eT) | 1 | RW | Refer to Table 2 |

TABLE 3-continued

| Attribute Name of <accessControlPolicy> | Multiplicity | RW/ RO/ WO | Description |
|---|---|---|---|
| labels (lBs) | 0 . . . 1 | RW | Refer to Table 2 |
| creationTime (cT) | 1 | RO | Refer to Table 2 |
| lastModifiedTime (lMT) | 1 | RO | Refer to Table 2 |
| Link | 1 | WO | This attribute shall be present only on the announced resource. This attribute shall provide the link (URI) to the original resource. This is only for <accessControlPolicyAnnc>. |
| announceTo | 1 | RW | Refer to Table 2 |
| announcedAttribute | 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| privileges (ps) | 1 | RW | The list of privileges defined by this <accessControlPolicy> resource. These privileges are applied to resources referencing this <accessControlPolicy> resource using the accessControlPolicyID attribute. |
| selfPrivileges (sP) | 1 | RW | Defines the list of privileges for the <accessControlPolicy> resource itself. |

Privileges can be generalized to actions (which may be granting access, but may also be more specific, granting access, i.e. filtering part of data). While the privileges can be generalized to conditions, which may include the identifier of a requestor, except specified identifiers, but the privileges may also include time based conditions.

An access authentication mechanism based on the access control policy operates by matching a requester to the privilege of the requester, stored in the <accessControlPolicy> resource. Upon discovery of positive matching, a requested operation (e.g. RETRIEVE) is checked using a set of allowed operations associated with a matching privilege owner. If the check fails, the request is rejected. Such set is referred to as a privilege flag.

Self-privileges and privileges are lists of requester privileges associated with the <accessControlPolicy> resource itself and privilege flags applied to the <accessControlPolicy> resource and all other resource types which address accessControlPolicyID common attribute.

All privileges defined in the access control policy are associated with positions, time windows and IP addresses prior to access authentication.

Each privilege of the self-privileges and privileges can be configured as a role. Such role is identified by a role name and a URL that addresses an M2M service subscription resource in which the role is defined. When a requester represents itself with a specific role, the access control policy operates by matching the requester with lists, which belong to a specific role specified in the M2M service subscription resource.

Each privilege in the privilege and self-privilege lists includes the following elements.

TABLE 4

| Name | Description |
|---|---|
| originatorPrivileges | Refer to Table 5 |
| Contexts | Refer to Table 6 |
| operationFlags | Refer to Table 7 |

"originatorPrivileges" includes information shown in the following table.

TABLE 5

| Name | Description |
|---|---|
| Domain | FQDN domain |
| Originator identifier | CSE ID or AE ID which represent a originator identity |
| Token | Access token usually provided as query parameter |
| All | All originators |
| Role | A role name associated with the URL the a Service Subscription resource where such role is defined |

"contexts" in Table 4 includes information shown in the following table.

TABLE 6

| Name | Description |
|---|---|
| Context | Defines the context in which every privileges of the present access control policy resource applies, e.g. time windows, location, and IP address. |

"operationFlags" in Table 4 includes information shown in the following table.

TABLE 7

| Name | Description |
| --- | --- |
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |

In an M2M communication system, an access control policy resource is stored separately from a resource to which the corresponding access control policy has been applied. The resource to which the access control policy has been applied has only AccessRightID (URI of the access control policy resource) of the access control policy resource. Accordingly, if an M2M entity wants to check an access control policy of a specific resource, the M2M entity needs to refer to AccessRightID.

Entity Registration

An M2M entity finishes preparation for using systems/services by registering with neighboring entities irrespective of whether the M2M entity is located in the field domain or infrastructure domain. Such registration is performed at the request of a registree and information on the registree is stored in a registrar as a registration result.

After registration, oneM2M entities can use M2M services using common functions provided by a CSE, as illustrated in FIG. 3.

oneM2M entities include an AE and a CSE and thus registration may be divided into AE registration and CSE registration. Here, both the AE and CSE refer to registrees and the CSE corresponds to a registrar. In the case of CSE registration, information on the registrar CSE is additionally stored in the registree CSE.

Figure 8:
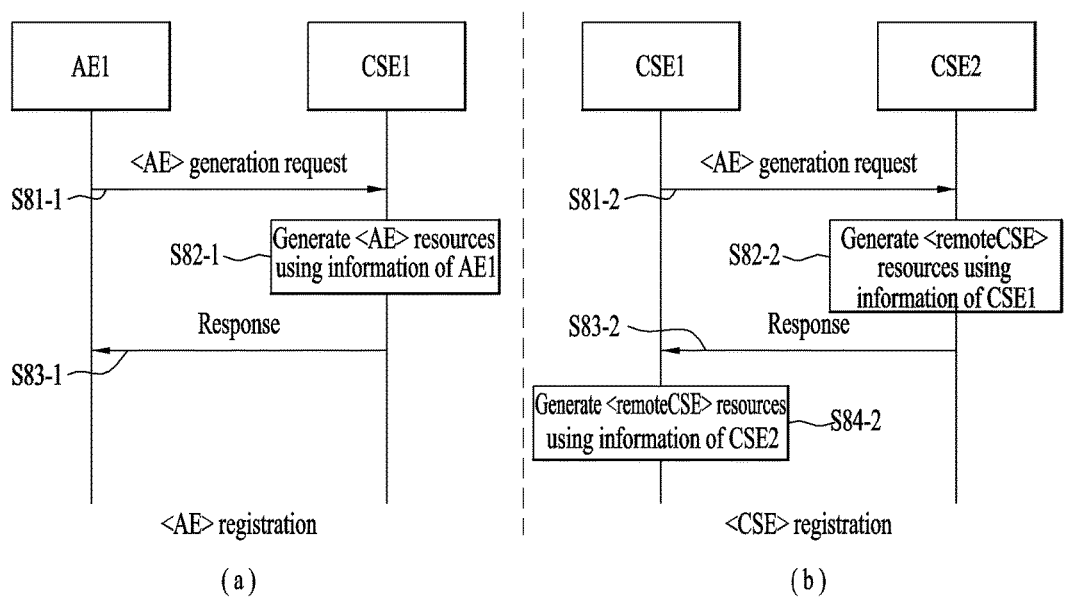
FIG. 8 illustrates a registration procedure in an M2M communication system.

FIG. 8 illustrates an AE registration procedure and a CSE registration procedure. FIG. 8(a) shows the AE registration procedure. AE1 that intends to perform registration sends a request for generation of <AE> resources to CSE1 corresponding to a registrar (S81-1). CSE1 can generate the <AE> resources using information of AE1 (S82-2). Then, CSE1 can send a response including a result of registration to AE1 (S83-2).

FIG. 8(b) illustrates the CSE registration procedure. The procedure of FIG. 8(b) corresponds to the procedure of FIG. 8(a) except that CSE1 corresponds to a registree, CSE2 corresponds to a registrar, and when CSE2 sends a result for a registration request of CSE1 (S83-2), CSE1 generates <remoteCSE> resources using information of CSE2 (S84-2).

Group Resource Type

A <group> resource indicates a group of resources of the same or mixed types. The <group> resource may be used to perform bulk manipulation on resources represented by a memberList attribute. The <group> resource includes an attribute that indicates members of the group and a virtual resource (<fanOutPoint>) that allows operations to be applied to resources represented by those members.

Upon being used as one of permission owners in an <accessControlPolicy> resource, the group may be used to grant a privilege to permit AEs or CSEs to access resources (e.g., creation of a child resource, retrieval, etc.).

The <fanOutPoint> resource is a virtual resource because it does not have a representation. Whenever a request is transmitted to the <fanOutPoint> resource, the request is fanned out to each of the members of the <group> resource indicated by the memberList attribute. Responses to the request from the respective members are aggregated and returned to an originator of the request. A timer should be set for aggregation. The responses are aggregated when all expected responses have been received or when a timer expires. The responses received after the timer expires are discarded. If a result expiration timestamp (rset) parameter is received from the originator, the timer is set to enforce this parameter and, otherwise, the timer is set based on a local policy configured at a hosting CSE.

The <fanOutPoint> resource does not have a resource representation by itself and consequently does not have accessControlPolicyIDs. The <accessControlPolicy> resource used for access control policy validation is indicated by memberAccessControlPolicyIDs of a parent <group> resource.

Attributes specific to the group resource are as follows. The table below lists only some attributes of the group resource.

TABLE 8

| Attributes of <group> | Multiplicity | RW/RO/WO | Description |
| --- | --- | --- | --- |
| memberType | 1 | WO | It is the resource type of the members resources of the group if all members resources (including the members resources in any sub-groups) are of the same type. Otherwise, it is of type 'mixed'. |
| currentNrOfMembers | 1 | RO | Current number of members in a group. It shall not be larger than maxNrOfMembers. |
| maxNrOfMembers | 1 | RW | Maximum number of members in the <group>. |
| membersList | 1 | RW | List of zero or more member URIs referred to in the remaining of this specification as memberID. Each URI (memberID) should refer to a members resource or a (sub-)<group> resource of the <group>. |
| memberAccessControlPolicyIDs | 0 . . . 1 (L) | RW | List of URIs of the <accessControlPolicy> resources defining who is allowed to access the <fanOutPoint> resource. |

TABLE 8-continued

| Attributes of <group> | Multiplicity | RW/RO/WO | Description |
|---|---|---|---|
| memberTypeValidated | 1 | RO | Denotes if memberType of all members resources of the group has been validated. |
| consistencyStrategy | 0 . . . 1 | WO | This attribute determines how to deal with the <group> resource if the memberType validation fails. Which means delete the inconsistent member if the attribute is ABANDON_MEMBER; delete the group if the attribute is ABANDON_GROUP; set the memberType to "mixed" if the attribute is SET_MIXED. |
| groupName | 0 . . . 1 | RW | Human readable name of the <group>. |

Group Management Procedure

Hereinafter, procedures for managing membership verification, creation, retrieval, update, and deletion of information associated with a <group> resource as well as bulk management of all group member resources by invoking a corresponding operation on the virtual <fanOutPoint> resource of the <group> resource will be described.

Procedure for Creating <group> Resource

TABLE 9

| <group> resource CREATE | |
|---|---|
| Associated Reference Point | Mcc and Mca |
| Information in Request Message | fr: Identifier of an AE or CSE that initiates the request<br>to: URI of <CSEBase> in which a <group> resource is intended to be created<br>cn: Attributes of the <group> resource |
| Processing at Originator before sending Request | The Originator shall request to Create a new group type resource to be named as <group> by using a CREATE operation. The request shall address <CSEBase> resource of a Hosting CSE. The Request shall also provide list of member URIs and may provide expirationTime attributes. The list of member URIs means a list of URIs of the member resources corresponding to the memberType attribute provided in the Request. The Originator may be an AE or a CSE. |
| Processing at Receiver | For the CREATE procedure, the Receiver shall:<br>Check if the originator has CREATE permissions on the <CSEBase> resource.<br>Check the validity of the provided attributes.<br>Validate that there are no duplicate members present in the memberList attribute.<br>Validate that the resource type of every member conforms to the memberType attribute of the <group> resource if the memberType attribute of the <group> resource is not 'mixed', and set the memberTypeValidated attribute to TRUE upon successful validation.<br>Upon successful validation of the provided attributes, create a new group resource including a <fanOutPoint> child-resource in the Hosting CSE.<br>Conditionally, in the case that the group resource contains temporarily unreachable Hosting CSE of sub-group resources as a member resource, set the memberTypeValidated attribute of the <group> resource to FALSE,<br>Respond to the originator with an appropriate generic response with the representation of the <group> resource if the memberTypeValidated attribute is FALSE, and the URI of the created <group> resource if the CREATE was successful.<br>As soon as any Hosting CSE that hosts the unreachable resource becomes reachable, the memberType validation procedure shall be performed. If the memberType validation fails, the Hosting CSE shall deal with the <group> resource according to a policy defined by the consistencyStrategy attribute of the <group> resource provided in the request or by default if the attribute is not provided. |
| Information in Response Message | The representation of the <group> resource if the memberTypeValidated attribute is FALSE |
| Processing at Originator after receiving Response | None |
| Exceptions | No change from a generic procedure |

<fanOutPoint> Resource Creation

Figure 9:
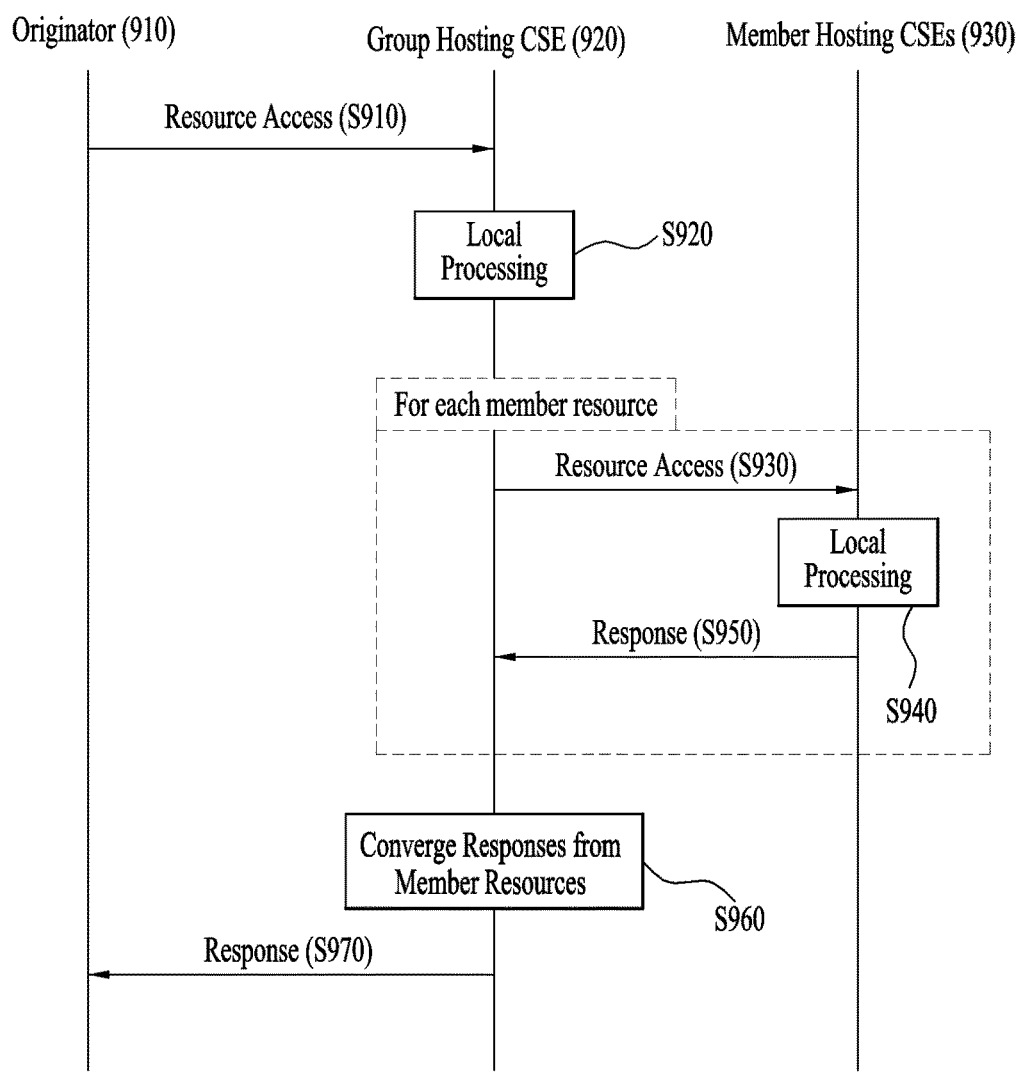
FIG. 9 illustrates a procedure for accessing group resource members.

FIG. 9 illustrates a procedure used to create content in all member resources belonging to an existing <group> resource.

An originator 910 may transmit a request for accessing member resources of a specific group to a group hosting CSE 920 (S910).

The group hosting CSE may process the request (S920). The group hosting CSE may check whether the originator 910 has a right to access the group resource. If the group includes a sub-group, a group request identifier is included in the request. If access is permitted, the group hosting CSE accesses the group resource and fans out the request to the member resources of the group (S930).

Member hosting CSEs 930, i.e., the member resources of the group may process the fanned-out request S940. The member resources compare the group request identifier with locally stored identifiers and determine the next operation. The member resources check an access right. If access is permitted, the member resources are accessed by the originator and respond with a success message and, otherwise, respond with an error message (S950).

The group hosting CSE may converge responses from the group members (S960). Then, the group hosting CSE may transmit the converged responses to the originator (S970).

TABLE 10

| <fanOutPoint> CREATE | |
|---|---|
| Associated Reference Point | Mcc and Mca |
| Information in Request message | fr: Identifier of the AE or the CSE that initiates the Request<br>to: The URI of the <fanOutPoint> virtual resource<br>cn: The representation of a resource that the originator intends to create<br>gid: A group request identifier |
| Processing at Originator before sending Request | The Originator shall request to create the content in all members resources belonging to an existing <group> resource by using a CREATE operation. The Request may address the virtual child resource <fanOutPoint> of a specific <group> resource of a group Hosting CSE to create the same content under all <members> resources. The request may also address the URI that results from appending a relative URI to the <fanOutPoint> URI in order to create the same content (e.g. attribute or child resource) under the corresponding attributes or child resources represented by the relative URI with respect to all members resources. The Originator may be an AE or CSE. |
| Processing at Group Hosting CSE | For the CREATE procedure, the Group Hosting CSE shall:<br>Check if the Originator has WRITE permission in the <accessControlPolicy> resource referenced by the members AccessControlPolicyIDs in the <group> resource. In the case that members membersAccessControlPolicyIDs is not provided, the access control policy defined for the <group> resource shall be used. Upon successful validation, obtain the URIs of all members resources from the attribute membersList of the addressed <group> resource.<br>Generate fan out requests addressing the obtained URIs (appended with the relative URI if any) to the member Hosting CSEs. The fr parameter in the request is set to ID of the Originator from the request from the original Originator.<br>In the case that the members resources contain a sub-group resource, generate a unique group request identifier, include the group request identifier in all the requests to be fanned out and locally store the group request identifier.<br>If the group Hosting CSE determines that multiple members resources belong to one CSE according to the URIs of the members resources, it may converge the requests accordingly before sending out. This may be accomplished by the group Hosting CSE creating a <group> resource on the members Hosting CSE to collect all the members on that members Hosting CSE.<br>After receiving the responses from the members Hosting CSEs, respond to the Originator with the aggregated results and the associated memberIDs. |
| Processing at Member Hosting CSE | For the CREATE procedure, the Member Hosting CSE shall:<br>Perform the corresponding CREATE procedure for the resource type in the request.<br>Check if the request has a group request identifier. Check if the group request identifier is contained in the requested identifiers stored locally. If match is found, ignore the current request and respond with an error. If no match is found, locally store the group request identifier.<br>Check if the original Originator has the CREATE permission on the addressed resource. Upon successful validation, perform the create procedures for the corresponding type of addressed resource as described in other sub-clauses of clause 10.2.<br>Send the corresponding response to the Group Hosting CSE. |
| Information in Response message | Converged responses from the members Hosting CSEs |
| Processing at Originator after receiving Response | None |
| Exceptions | Same request with an identical group request identifier received<br>Originator does not have the access control privileges to access the <fanOutPoint> resource. |

Subscription Resource Type

A <subscription> resource contains subscription information for its subscribed-to resource. The <subscription> resource is a child resource of the subscribed-to resource. Therefore, the <subscription> resource is represented as a child resource of the subscribed-to resource. For example, a <container> resource has the <subscription> resource as a child resource. The <subscription> resource is deleted when a parent subscribed-to resource is deleted.

The <subscription> resource represents a subscription to a subscribed-to resource. An originator is able to create a resource of a <subscription> resource type when the originator has RETRIEVE privilege to the subscribe-to resource. The originator which creates the <subscription> resource becomes a resource subscriber.

Each <subscription> resource may include notification policies that specify which, when, and how notifications are sent. These notification policies may operate in conjunction with CMDH policies.

When the <subscription> resource is deleted, a Notify request should be sent to a subscriberURI provided by the originator.

The <subscription> resource has a child resource, the name of which is notificationSchedule and a resource type of which is <schedule>. In the context of the <subscription> resource, the notificationSchedule resource specifies when notifications may be sent by a host CSE to notificationURI(s).

Attributes specific to the <subscription> resource are as follows. The table below lists only partial attributes of the <subscription> resource.

TABLE 11

| Attributes of <subscription> | Multiplicity | RW/RO/ WO | Description |
| --- | --- | --- | --- |
| accessControlPolicyIDs | 0 . . . 1 (L) | RW | See Table 2. If no accessControlPolicyIDs is given at the time of creation, the accesControlPolicies of the parent resource is linked to this attribute. |
| eventNotificationCriteria | 0 . . . 1 (L) | RW | This notification policy indicates the event criteria for which a notification is to be generated. |
| expirationCounter | 0 . . . 1 | RW | This notification policy indicates that the subscriber wants to set the life of this subscription to a limit of a maximum number of notifications. When the number of notifications sent reaches the count of this counter, the <subscription> resource shall be deleted, regardless of any other policy. |
| notificationURI | 1 (L) | RW | List of URI(s) where the resource subscriber will receive notifications. This list of URI(s) may not represent the resource subscriber entity. For a group-related subscription, the notificationURI shall be the URI that is generated by the group Hosting CSE to receive notifications. In this case, the resource subscriber notification URI shall be included in the notificationForwardingURI. |
| groupName | 0 . . . 1 | RW | The URI of a <group> resource in case the subscription is made through a group. |
| notificationForwardingURI | 0 . . . 1 | RW | The attribute is a forwarding attribute that shall be present only for group related subscriptions. It represents the resource subscriber notification URI. It shall be used by group Hosting CSE for forwarding aggregated notifications. |
| batchNotify | 0 . . . 1 | RW | This notification policy indicates that the subscriber wants to receive batches of notifications rather than receiving them one at a time. This attribute expresses the subscriber's notification policy and may include two values: the number of notifications to be batched for delivery and a duration. When either value is set, notification events are temporarily stored until either the specified number of notifications have been batched, or, until a duration which starts after the first notification was generated has expired. Following which the batched notifications are sent. If batchNotify is used simultaneously |

TABLE 11-continued

| Attributes of <subscription> | Multiplicity | RW/RO/WO | Description |
|---|---|---|---|
| | | | with latestNotify, only the latest notification shall be sent and have the ec set to "latest". |
| rateLimit | 0 . . . 1 | RW | This notification policy indicates that the subscriber wants to limit the rate at which it receives notifications. This attribute expresses the subscriber's notification policy and includes two values: a maximum number of events that may be sent within some duration, and the rateLimit window duration. When the number of generated notifications within the rateLimit window duration exceeds the maximum number, notification events are temporarily stored, until the end of the window duration, when sending of notification events restarts in the next window duration. The sending of notification events continues as long as the maximum number of notification events is not exceeded during the window duration. The rateLimit policy may be used simultaneously with other notification policies.) |
| preSubscriptionNotify | 0 . . . 1 | WO | This notification policy indicates that the subscriber wants to be sent notifications for events that were generated prior to the creation of this subscription. This attribute has a value of the number of prior notification events requested. If up-to-date caching of retained events is supported on the Hosting CSE and contains the subscribed events then prior notification events will be sent up to the number requested. The preSubscriptionNotify policy may be used simultaneously with any other notification policy. |
| pendingNotification | 0 . . . 1 | RW | This notification policy, if set, indicates how to handle missed notifications due to a period of connectivity (according to the reachability and notification schedules). The possible values for pendingNotification are: "sendLatest" "sendAllPending" This policy depends upon caching of retained notifications on the hosted CSE. When this attribute is set, only the last notification shall be sent and it shall have the ec set to "latest". If this attribute is not present, the Hosting CSE sends no missed notifications. This policy applies to all notifications regardless of the selected delivery policy (batching, latestNotification, etc..) Note that unreachability due to reasons other than scheduling is not covered by this policy. |
| notificationStoragePriority | 0 . . . 1 | RW | Indicates that the subscriber wants to set a priority for this subscription relative to other subscriptions belonging to the same subscriber. This attribute sets a number within the priority range. When storage of notifications exceeds the allocated size, this policy is used as an input with the storage congestion policy to determine which stored and generated notifications to drop and which ones to retain. |

TABLE 11-continued

| Attributes of <subscription> | Multiplicity | RW/RO/WO | Description |
| --- | --- | --- | --- |
| latestNotify | 0 . . . 1 | RW | This notification policy indicates if the subscriber wants only the latest notification. If multiple notifications of this subscription are buffered, and if the value of this attribute is set to true, then only the last notification shall be sent and it shall have the ec value set to "latest". |
| notificationContentType | 1 | RW | Indicates a notification content type that shall be contained in notifications. The allowed values are:. modified attributes only whole resource optionally the reference to this subscription resource. |
| notificationEventCat | 0 . . . 1 | RW | This notification policy indicates the subscriber's requested ec to be used for notification messages generated by this subscription. |
| creator | 0 . . . 1 | WO | AE-ID or CSE-ID which created the <subscription> resource. |
| subscriberURI | 0 . . . 1 | WO | URI that is sent a notification when this <subscription> is deleted. |

The eventNotificationCriteria conditions are described below.

TABLE 12

| Condition tag | Multiplicity | Matching condition |
| --- | --- | --- |
| createBefore | 0 . . . 1 | The creationTime attribute of the resource is chronologically before the specified value. |
| createdAfter | 0 . . . 1 | The creationTime attribute of the resource is chronologically after the specified value. |
| modifiedSince | 0 . . . 1 | The lastModifiedTime attribute of the resource is chronologically after the specified value. |
| unmodifiedSince | 0 . . . 1 | The lastModifiedTime attribute of the resource is chronologically before the specified value. |
| stateTagSmaller | 0 . . . 1 | The stateTag attribute of the resource is smaller than the specified value. |
| stateTagBigger | 0 . . . 1 | The stateTag attribute of the resource is bigger than the specified value. |
| expireBefore | 0 . . . 1 | The expirationTime attribute of the resource is chronologically before the specified value. |
| expireAfter | 0 . . . 1 | The expirationTime attribute of the resource is chronologically after the specified value. |
| sizeAbove | 0 . . . 1 | The contentSize attribute of the <contentInstance> resource is equal to or greater than the specified value. |
| sizeBelow | 0 . . . 1 | The contentSize attribute of the <contentInstance> resource is smaller than the specified value. |
| resourceStatus | 0 . . . n | When the subscribed-to resource is changed by the operations or expiration, the resource status is the same as the specified value. Possible values are: child created, updated, child deleted, deleted. If child created or child deleted is configured, other eventNotificationCriteria conditions shall be applied to the created or deleted child resource. Notification contains the contents for a created child resource or deleted child resource based on value of notificationContentType attribute. If this condition is not specified, the default value is updated. |
| operationMonitor | 0 . . . n | The operations accessing the subscribed-to resource match the specified value. It allows monitoring which operation is attempted to the subscribed-to resource regardless of whether the operation is performed. This feature is useful when trying to find malicious AEs. Possible string arguments are: create, retrieve, update, delete. |
| attribute | 0 . . . n | This is an attribute name of resource types. For example, creator of container resource type can be used as "creator = Sam". When multiple attributes are set then the result is based upon the AND of all attributes. |

Figure 10:
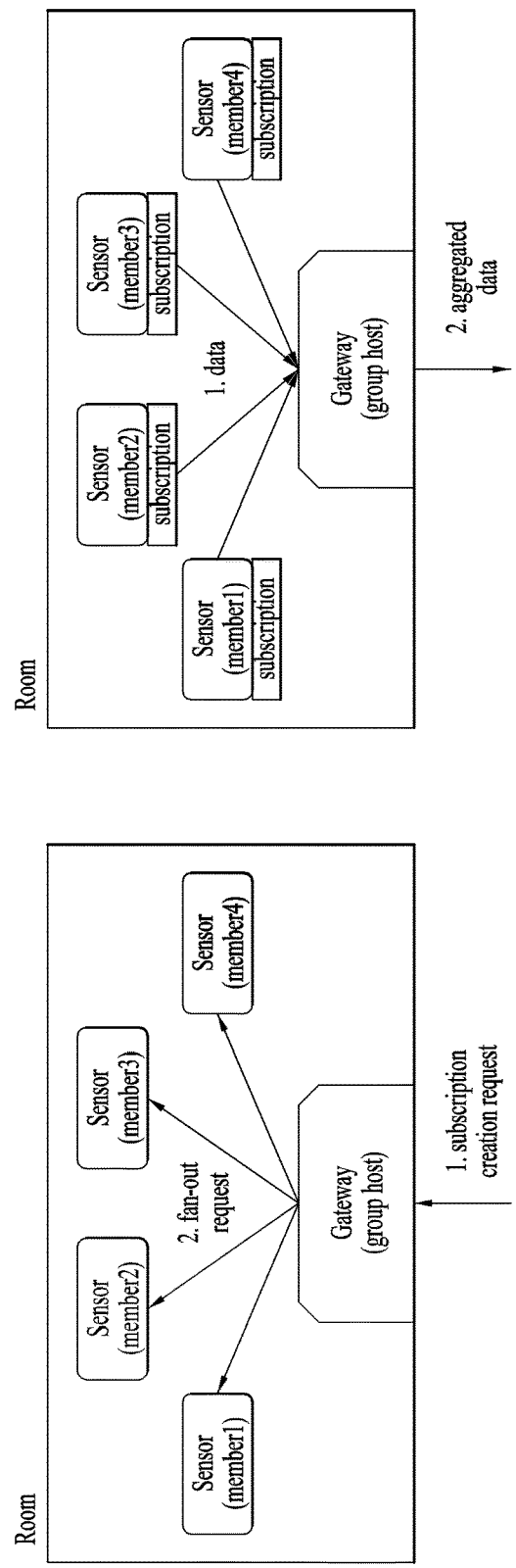
FIG. 10 illustrates a subscription service.

FIG. 10 illustrates an example of grouping various sensors in a room, setting a subscription for groups, and then acquiring sensor information through a notification. An originator may specify or establish a policy to be applied when a sensor transmits a notification after subscription creation (hereinafter, a member policy) and a policy to be applied when a gateway transmits an aggregated notification (hereinafter, a group policy).

Figure 11:
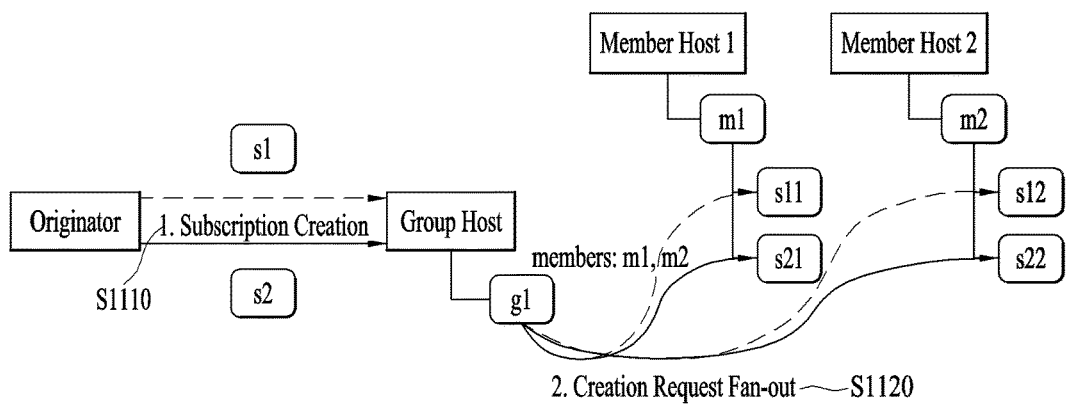
FIG. 11 illustrates a subscription resource creation procedure through a group function.

FIG. 11 illustrates an example in which an originator configures a notification (creates a <subscription> resource) through a group g1 set in a group host with respect to members (m1 and m2) of the group. The originator does not additionally specify the name of the <subscription> resource because, among member resource children, a resource of the same name may be created by other entities. Accordingly, subscription resources s1 and s2 requested by the originator in FIG. 11 are arbitrarily specified names of the <subscription> resource for convenience of description. If the originator requests that two subscriptions be created through a group in S1110, a group host performs a procedure for creating subscription resources s11 and s12 for s1 and subscription resources s21 and s22 for s2 in members, in S1120.

Figure 12:
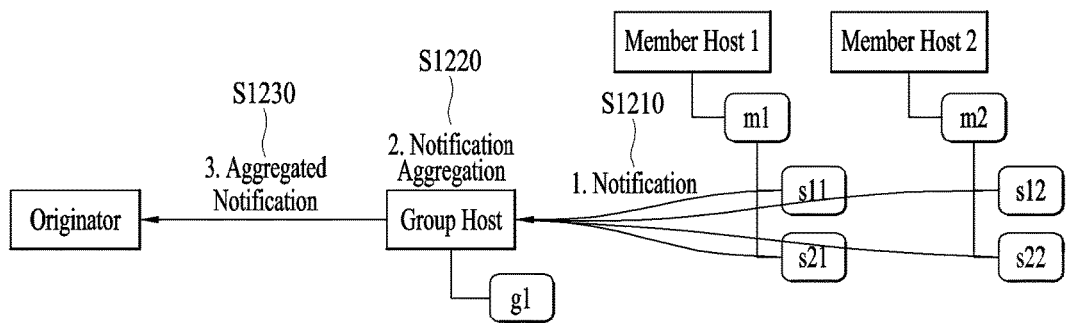
FIG. 12 illustrates a procedure for transmitting and receiving a notification according to a subscription created through a group function.

FIG. 12 illustrates a procedure in which, after subscription resources are created as in FIG. 11, notifications occur by respective members and a group host transmits an aggregated notification to an originator. In an example of FIG. 12, it is assumed that s1 and s2 are configured such that the notifications according to s1 and s2 are transmitted to the originator. When a notification occurs, each member may transfer the notification to the group host in order to transmit the notification to the originator (S1210). Upon receiving notifications from the respective members, the group host may collect or aggregate notifications per final target included in each notification (S1220). Therefore, the notifications received from s11, s12, s21, and s22 may be aggregated as one notification and then transmitted to the originator (S1230).

However, when the notifications received from the respective members are aggregated, if the notifications are aggregated per final target (the originator in the example of FIG. 11), the group host cannot apply a differential notification policy per subscription resource s1 or s2. That is, since different subscriptions may use the same notification target (e.g., the originator), the group host needs to perform notification aggregation according to different criteria and apply a corresponding notification policy.

In the present specification, a description will be given of a method of applying a group policy corresponding to each group subscription by performing notification aggregation on a created subscription (i.e. group subscription) basis, without performing notification aggregation on a notification target basis according to a created subscription, when an originator creates subscriptions (or subscription resources) through a group function.

Figure 13:
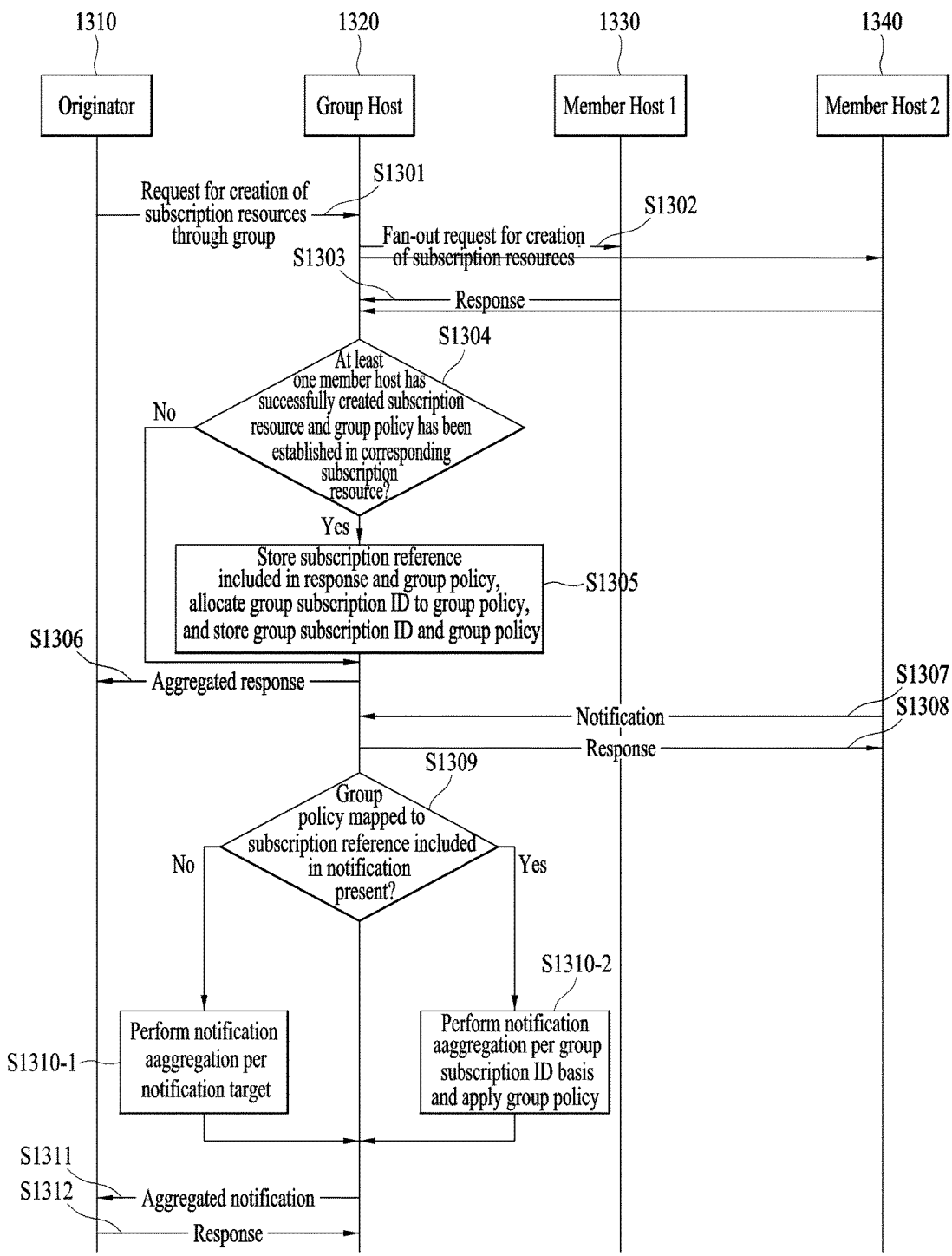
FIG. 13 illustrates a procedure according to an embodiment of the present invention.

FIG. 13 illustrates a method of applying a group policy to a notification of a group subscription according to an embodiment of the present invention. In the embodiment of FIG. 13, it is assumed that a target of the notification is set as an originator.

An originator 1310 may transmit a request for creation of subscriptions (or subscription resources) through a group to a group host 1320 (S1301). In this case, the group host may temporarily store the received request.

The group host may transmit the request to member hosts (S1302). The request may be transmitted through a <fanOutPoint> resource.

Each member host may process the request and transmit a response to the request to the group host (S1303). If the request is successfully processed, the response may include a subscription reference of each subscription resource (e.g., a URI of the subscription resource).

When one or more member hosts have successfully created subscription resources, the group host may check whether a group policy has been established in a corresponding subscription (or corresponding subscription resource) (S1304). The group policy may check whether the group policy has been established in the corresponding subscription by confirming whether the group policy has been established in the temporarily stored request.

If the group policy has been established in the corresponding subscription, the group host may store each subscription reference together with the group policy (S1305). In this case, the group host may allocate a group subscription ID to the group policy and store the group subscription ID together with the group policy.

If a member host that has created the subscription resource is not present or if the group policy has not been established in the corresponding subscription even when the subscription resource has been successfully created, the procedure proceeds to S1306.

The group host may aggregate responses received from respective member hosts and transmit an aggregated response to the originator (S1306).

Next, the group host may receive notifications from the member hosts (S1307). That is, when a notification occurs according to a policy of each subscription, the notification may be transmitted to the group host. The notification may include a subscription reference.

The group host may transmit a response to the notification to each member host (S1308).

The group host may check whether there is a group policy mapped to the subscription reference included in the received notification (S1309).

If it is confirmed that the group policy mapped to the subscription reference included in the received notification is not present, the group host may perform notification aggregation based on a target of the received notification (S1310-1). If it is confirmed that the group policy mapped to the subscription reference included in the received notifications is present, the group host may perform notification aggregation based on a group subscription ID of the received notification and apply the group policy mapped to the group subscription ID (S1310-2).

Next, the group host may transmit an aggregated notification to the originator (S1311). In addition, the group host may receive a response to the aggregated notification from the originator (S1312).

Table 13 lists group policies usable in the embodiment associated with FIG. 13.

TABLE 13

| gsID(1) (key value) | subRef (1 . . . n) | Group Policy Info |
| --- | --- | --- |
| s1 | memHost1/m1/s11memHost2/m2/s12 | Aggregation window = 5 s |
| s2 | memHost1/m1/s21memHost2/m2/s22 | Aggregation counter = 50 |

Figure 14:
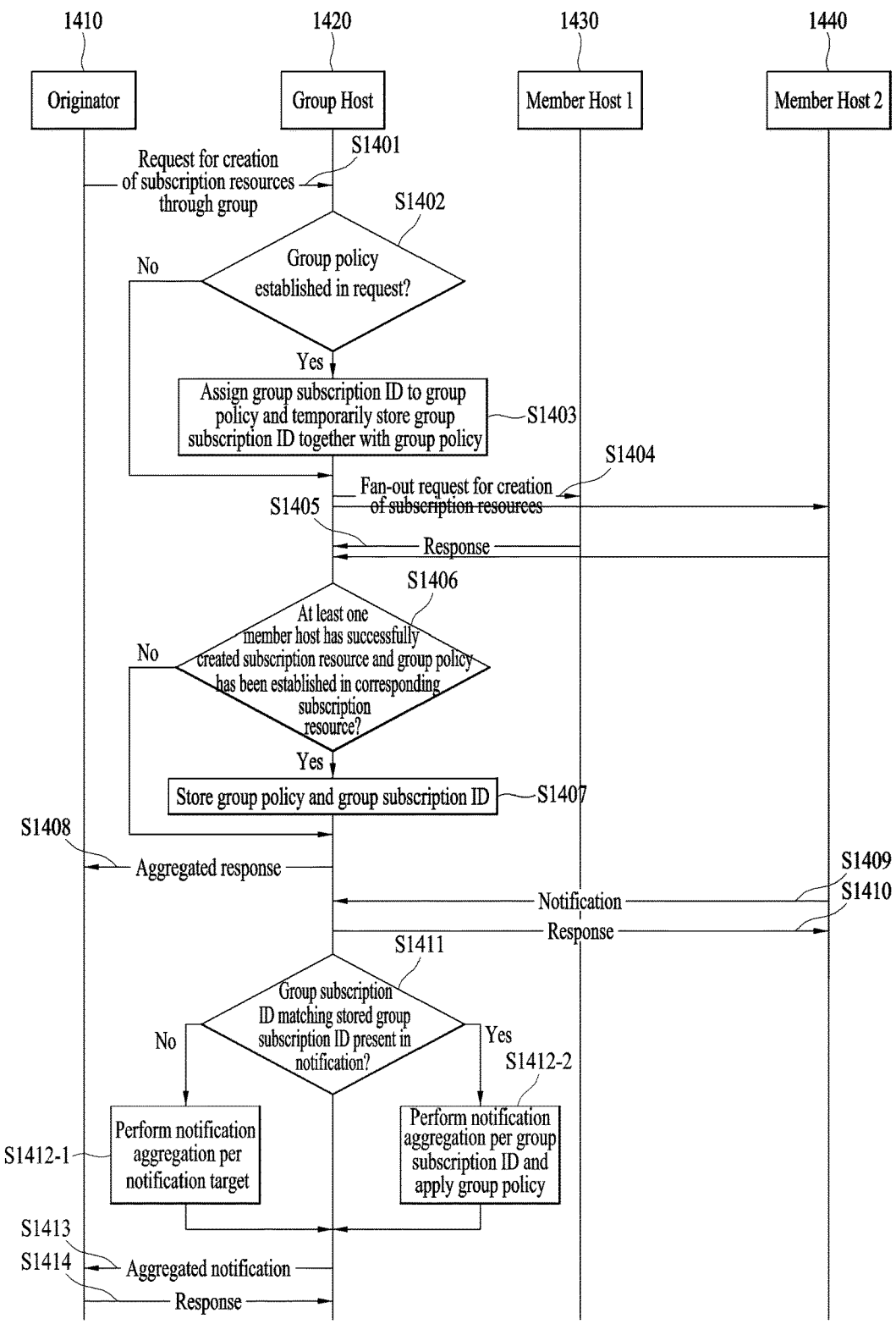
FIG. 14 illustrates a procedure according to an embodiment of the present invention.

FIG. 14 illustrates a procedure for applying a group policy to a notification of a group subscription according to an embodiment of the present invention. In the embodiment of FIG. 13, it is assumed that a target of the notification is set as an originator.

An originator 1410 may transmit a request for creation of subscriptions (or subscription resources) to a group host 1420 through a group (S1401).

The group host may check whether a group policy has been established in the request (S1420).

If the group policy has been established in the request, the group host may allocate a group subscription ID to the group policy and include the group subscription ID in a request to be transmitted to each member host (S1403). Next, the group host may temporarily store the group policy together with the group subscription ID.

The group host may transmit the request to each member host (S1404). The transmitted request may include the group subscription ID. The request may be transmitted through a <fanOutPoint> resource.

Each member host may process the request and transmit a response to the request to the group host (S1405). If the request is successfully processed, the response may include a subscription reference (e.g., a URI of the created subscription resource).

The group host may check a response received from each member host to confirm whether at least one member host has successfully processed the request (i.e. whether the subscription resource has been successfully created) and whether the request corresponding to the response includes the group policy or a group policy ID (S1406). To this end, upon transmitting a request message to each member, the group host may temporarily store the request message. In this case, the group host does not store the entire request message and may store only a request ID and a group subscription ID of the request message. Then, the group host may confirm whether a request message matching a request ID included in the response received in S1405 includes the group subscription ID.

If at least one member host has successfully processed the request and if the request corresponding to the response includes the group policy or the group policy ID, the group host may store the temporarily stored group policy and group subscription ID (S1407).

Otherwise, the procedure proceeds to S1408 and the group host may delete the temporarily stored group policy and group subscription ID.

The group host may aggregate responses received from respective member hosts in S1405 and transmit an aggregated response to the originator (S1408).

Next, the group host may receive a notification from at least one member host (S1409). The notification may include the group subscription ID transmitted to each member through the request.

The group host may transmit a response to the notification to the at least one member host (S1410).

The group host may confirm whether a group subscription ID matching the group subscription ID stored thereby is included in the received notification (S1411).

If it is confirmed that a group subscription ID matching the group subscription ID stored by the group host is not included in the received notification, the group host may perform notification aggregation based on a target of the received notification (S1412-1). If it is confirmed that a group subscription ID matching the group subscription ID stored by the group host is included in the received notification, the group host may perform notification aggregation based on a group subscription ID of the received notification and apply a group policy mapped to the group subscription ID (S1412-2).

Next, the group host may transmit an aggregated notification to the originator (S1413). In addition, the group host may receive a response corresponding to the aggregated notification from the originator (S1414).

The table below lists a group policy usable in the embodiment associated with FIG. 14.

TABLE 14

| gsID(1) (key value) | Group Policy Info |
|---|---|
| s1 | Aggregation window = 5 s |
| s2 | Aggregation counter = 50 |

Figure 15:
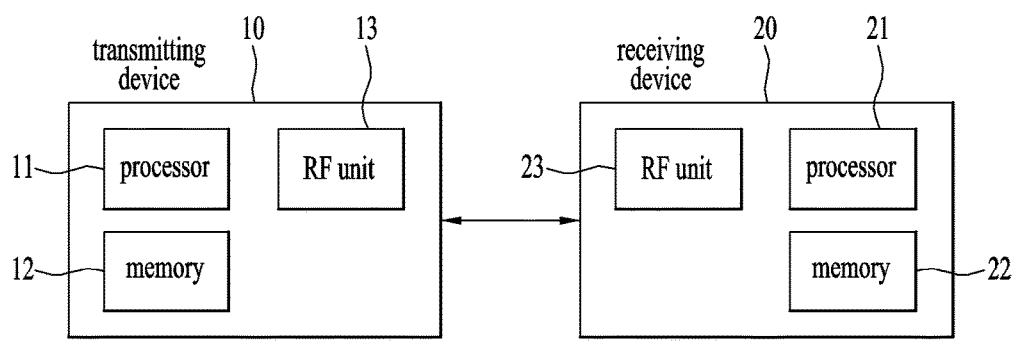
FIG. 15 is a block diagram of apparatuses for implementing embodiment(s) of the present invention.

FIG. 15 is a block diagram of a transmitting device 10 and a receiving device 20 configured to implement exemplary embodiments of the present invention. Referring to FIG. 15, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method of processing a notification message for applying a group policy to a notification subscription in a wireless communication system, the method being performed by a first machine-to-machine (M2M) device and comprising:
receiving a plurality of notification messages which are triggered to be generated and transmitted when an event notification criteria of a subscription or a group subscription is satisfied;
determining whether a group subscription ID matching a group subscription ID pre-stored in the first M2M device is included in the received notification messages,
wherein the pre-stored group subscription ID is associated with a group policy applied to the group subscription, and the group subscription is requested and configured by a second M2M device for receiving notification messages for member resources belonging to a specific group; and
aggregating notification messages including the group subscription ID matching the pre-stored group subscription ID using the group policy corresponding to the pre-stored group subscription ID,
wherein the notification messages including the group subscription ID matching the pre-stored group subscription ID are received from group member M2M devices hosting the member resources belonging to the specific group.

2. The method according to claim 1, further comprising aggregating messages that do not include the group subscription ID matching the pre-stored group subscription ID according to target information of the notification messages.

3. The method according to claim 1, further comprising transmitting the notification messages to which the group policy is applied to the second M2M device.

4. The method according to claim 1, wherein the group subscription ID is assigned by the first M2M device.

5. A machine-to-machine (M2M) device for processing a notification message for applying a group policy to a notification subscription in a wireless communication system, the M2M device comprising:
a transceiver; and
a processor that:
controls the transceiver to receive a plurality of notification messages which are triggered to be generated and transmitted when an event notification criteria of a subscription or a group subscription is satisfied,
determines whether a group subscription ID matching a group subscription ID pre-stored in the M2M device is included in the received notification messages,
wherein the pre-stored group subscription ID is associated with a group policy applied to the group subscription, and the group subscription is requested and configured by a second M2M device for receiving notification messages for member resources belonging to a specific group, and
aggregate notification messages including the group subscription ID matching the pre-stored group subscription ID using the group policy corresponding to the pre-stored group subscription ID,
wherein the notification messages including the group subscription ID matching the pre-stored group subscription ID are received from group member M2M devices hosting the member resources belonging to the specific group.

6. The M2M device according to claim 5, wherein the processor is configured to aggregate messages that do not include the group subscription ID matching the pre-stored group subscription ID according to target information of the notification messages.

7. The M2M device according to claim 5, wherein the processor transmits the notification messages to which the group policy is applied to the second M2M device.

8. The M2M device according to claim 5, wherein the group subscription ID is assigned by the M2M device.

* * * * *